Aug. 11, 1925.
A. NIEMELA
TESTING DEVICE
Filed March 7, 1925
1,549,373
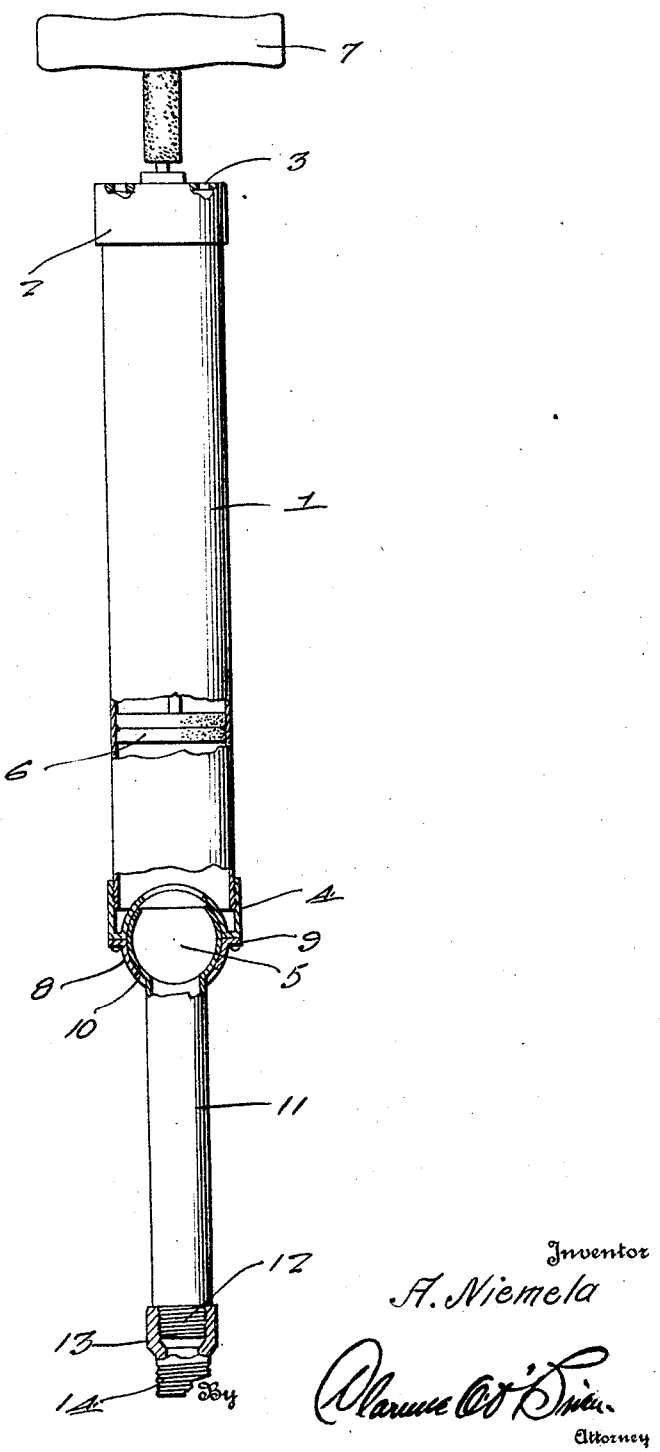
Inventor
A. Niemela
Attorney Patented Aug. 11, 1925.

1,549,373

UNITED STATES PATENT OFFICE.

ANDREW NIEMELA, OF CHISHOLM, MINNESOTA.

TESTING DEVICE.

Application filed March 7, 1925. Serial No. 13,762.

*To all whom it may concern:*

Be it known that I, ANDREW NIEMELA, a citizen of the United States, residing at Chisholm, in the county of St. Louis and State of Minnesota, have invented certain new and useful Improvements in a Testing Device, of which the following is a specification.

This invention relates to an improved testing device especially adapted for use in connection with motor vehicles.

The invention has more particular reference to an automotive tester adapted to enable a person to locate leaking valves, loose connecting rod joints, etc.

More particularly, the invention relates to a device of this class which is in the form of a hand operated pump adapted to be selectively tapped into one of the spark plug openings in a motor head after the plug is removed for the purpose of ascertaining compression in the cylinders, leaky valves and otherwise enabling the user to accurately determine the condition of the motor.

The structural details utilized in carrying the invention into effect and the advantages derived from their use will become apparent from the following description and drawing.

In the accompanying drawing forming a part of this application and in which like numerals are employed to designate like parts throughout the same:

The single figure represents a view in elevation and partly in section showing an automotive tester constructed in accordance with the present invention.

Referring to the drawing in detail, it will be seen that the reference character 1 designates an open ended cylinder on the upper end of which is a cap 2 provided with a plurality of air ports 3. A similar cap 4 is threaded onto the lower end of the cylinder, and this cap is provided with a semi-spherical seat 5 which serves the purpose to be hereinafter described. Slidable within the cylinder is a piston 6, the rod of which extends through the upper cap 3 and is provided with an operating handle 7. In general configuration the pump resembles a common automobile tire pump now frequently used. A semi-spherical cup 8 provided with a marginal attaching flange 9 is fastened in any appropriate manner to the lower cap 4. This cup and the aforesaid semi-spherical seat are provided with aligned openings, and it is obvious that when the cup is placed it serves to coact with the portion 5 in forming a socket for a spherical or ball-like head 10 on the inner end of an air discharge tube 11. A flexible ball and socket joint is thus provided between the tube and cylinder. The free end of the tube 11 is reduced and screw threaded as is indicated at 12, and a nipple 13 is screwed thereon, this nipple having a reduced screw threaded neck 14 to adapt it for attachment to a spark plug opening or the like.

In practice, a desired one of the spark plugs is removed and a nipple 13 of appropriate size is tapped into the opening. The piston in that particular cylinder is moved to firing position, and by actuating the pump in the customary way, it may be readily ascertained whether or not loose connecting rod joints exist. If a loose joint does exist, a knocking noise will be heard under the action of the tester and piston. If no loose joint exists, no noise will be heard. Also, if the valves are not seating properly, air will escape with sufficient noise to indicate a leaky valve.

It is thought that by considering the description in connection with the drawing carefully, persons skilled in the art to which the invention relates will be able to obtain a clear understanding of the same. Therefore, a more lengthy description is thought unnecessary.

Although the preferred embodiment of the invention has been shown and described, it is to be understood that minor changes coming within the field of invention claimed may be resorted to if desired.

Having thus described the invention, what I claim as new is:—

1. An automotive tester of the class described comprising a hand pump and a tube, said tube being connected to the body of the pump through the medium of a ball and socket joint.

2. An automotive tester of the kind specified comprising a cylinder, a piston slidable in said cylinder and embodying a stem equipped with a handle, a cap fitted onto the discharge end of said cylinder, said cap being provided with an inwardly concaved semi-spherical seat, a tube provided on its inner end with a ball head, a portion of which is arranged in said seat, and a retaining cup connected to said cap, said cup being of semi-spherical form and serving to cooperate with said seat in forming a socket for said ball head.

In testimony whereof I affix my signature.

ANDREW NIEMELA.